(12) United States Patent
Jung et al.

(10) Patent No.: US 12,251,749 B2
(45) Date of Patent: Mar. 18, 2025

(54) EQUIPMENT AND METHOD FOR MANUFACTURING SEPARATOR FOR FUEL CELL

(71) Applicant: ELF SYSTEM CO., LTD., Changwon-si (KR)

(72) Inventors: Byung-Soo Jung, Changwon-si (KR); Myoung-Ku Oh, Goyang-si (KR); Young-Suk Choi, Gimhae-si (KR); Dong-Hun Kang, Changwon-si (KR)

(73) Assignee: ELF SYSTEM CO., LTD., Changwon-si (KR)

( * ) Notice: Subject to any disclaimer, the term of this patent is extended or adjusted under 35 U.S.C. 154(b) by 634 days.

(21) Appl. No.: 17/608,553

(22) PCT Filed: Jul. 23, 2020

(86) PCT No.: PCT/KR2020/009736
§ 371 (c)(1),
(2) Date: Nov. 3, 2021

(87) PCT Pub. No.: WO2021/033932
PCT Pub. Date: Feb. 25, 2021

(65) Prior Publication Data
US 2022/0219222 A1    Jul. 14, 2022

(30) Foreign Application Priority Data
Aug. 20, 2019   (KR) .......................... 10-2019-0101616

(51) Int. Cl.
*B21D 39/03*    (2006.01)
*B21D 37/10*    (2006.01)
(Continued)

(52) U.S. Cl.
CPC ............. *B21D 39/03* (2013.01); *B21D 37/10* (2013.01); *H01M 8/0206* (2013.01); *H01M 8/0228* (2013.01); *H01M 8/0258* (2013.01)

(58) Field of Classification Search
CPC ........ B21D 37/10; B21D 28/34; B21D 13/02; B21D 28/02; B23K 2101/16;
(Continued)

(56) References Cited

U.S. PATENT DOCUMENTS 5,720,446 A    2/1998  Blandin
2012/0061453 A1  3/2012  Vogt et al.

FOREIGN PATENT DOCUMENTS

JP    H 0847898    2/1996
JP    2001143722 A  *  5/2001  ......... B29C 37/0007
(Continued)

OTHER PUBLICATIONS

Tanaka Y; JP-2012182140-A; Machine Translation (Year: 2012).*
(Continued)

*Primary Examiner* — Adam A Arciero
(74) *Attorney, Agent, or Firm* — Dority & Manning, P.A.

(57) ABSTRACT

Equipment for manufacturing a separator plate for a fuel cell comprises: a press which receives a conveyed first metal strip and second metal strip, vertically arranges the metal strips side by side, and forms patterns on each of the first metal strip and the second metal strip; a welding machine which overlaps the first metal strip and the second metal strip conveyed from the press, and integrally joins the metal strips by welding same in a state in which the patterns are aligned face-to-face with each other; and guide rolls which are arranged in front of and behind the press and guide the first metal strip so that the first metal strip is supplied to the welding machine at an overlapping position with the second
(Continued)

metal strip after passing through the press at a position spaced vertically apart from the second metal strip.

7 Claims, 9 Drawing Sheets

(51) Int. Cl.
*H01M 8/0206* (2016.01)
*H01M 8/0228* (2016.01)
*H01M 8/0258* (2016.01)

(58) Field of Classification Search
CPC .............. B23K 2101/36; B23K 26/0846; B23K 26/21; B23K 26/32; B23K 26/323; B23K 26/707; H01M 8/0254; H01M 8/026; H01M 8/0267; Y02E 60/50; Y02P 70/50
See application file for complete search history.

(56) References Cited

FOREIGN PATENT DOCUMENTS

| | | | |
|---|---|---|---|
| JP | 2012-182140 | | 9/2012 |
| JP | 2012182140 A | * | 9/2012 |
| KR | 10-2009-0007098 | | 1/2009 |
| KR | 10-2013-0003880 | | 1/2013 |
| KR | 10-1321125 | | 10/2013 |
| KR | 10-2067252 | | 1/2020 |

OTHER PUBLICATIONS

Saito et al., JP-2001143722-A Espacenet machine translation, 2001 (Year: 2001).*
Extended European Search Report for corresponding European Application No. 20855297.6, dated Jun. 21, 2022, 9 pages.
PCT International Search Report (w/ English translation) for corresponding PCT Application No. PCT/KR2020/009736, mailed on Oct. 27, 2020, 6 pages.

* cited by examiner

EQUIPMENT AND METHOD FOR MANUFACTURING SEPARATOR FOR FUEL CELL

CROSS REFERENCE TO RELATED APPLICATIONS

This application is the U.S. National Stage entry of International Application No. PCT/KR2020/009736 filed under the Patent Cooperation Treaty and having a filing date of Jul. 23, 2020, which claims priority to Korean Patent Application No. 10-2019-0101616 having a filing date of Aug. 20, 2019, which are incorporated herein by reference.

TECHNICAL FIELD

The present disclosure relates to equipment and a method for manufacturing a separator PLATE for a fuel cell.

BACKGROUND ART

Fuel cells generate electrical energy through an electrochemical reaction between hydrogen and oxygen, and have a structure in which a separator plate is disposed on both sides of a membrane electrode assembly (MEA). Such fuel cells are connected to a plurality of unit cells in series to form a fuel cell stack.

The separator plate for fuel cells is comprised of an anode separator plate for supplying fuel gas (hydrogen gas) to the membrane electrode assembly with the membrane electrode assembly interposed therebetween, and a cathode separator plate for supplying oxidizing gas (air) to the membrane electrode assembly, and has a structure in which the anode separator plate and the cathode separator plate are integrated through welding joining (welding type joining) or gasket bonding (gasket type joining).

Conventionally, in manufacturing a separator plate, a material constituting the anode separator plate and a material constituting the cathode separator plate are cut in a form of a plate, respectively, and supplied separately, a stamping process and a molding inspection process are performed for each material individually, and then the anode separator plate and the cathode separator plate are manufactured as products. The anode separator plate and the cathode separator plate, each manufactured as individual products, are conveyed in a loaded state, respectively, and an anode separator plate and a cathode separator plate are supplied one by one, respectively, from a laminate of the anode separator plate and the cathode separator plate, and an integrated separator plate is manufactured through a welding joining or gasket joining process.

As described above, in the prior art, each process is performed individually and intermittently, conveying for a subsequent process may consume time, and there may be a problem in that manpower must be input for each process, and an entire manufacturing process is complicated.

DISCLOSURE

Technical Problem

The present invention has been devised to solve the above problems, an object of the present disclosure is to provide equipment for manufacturing a separator plate for a fuel cell in which a process is continuously performed in an in-line manner rather than being performed intermittently and individually, and a method for manufacturing the same.

However, the object of the present disclosure is not limited to the object described above, and other objects which are not described above may be clearly understood by those skilled in the art from the following description.

Technical Solution

According to an aspect of the present disclosure, equipment for manufacturing a separator plate for a fuel cell, includes: a press receiving a conveyed first metal strip and a second metal strip that are unwound from a first uncoiler and a second uncoiler, respectively, vertically arranging the metal strips side by side, and forming patterns on each of the first metal strip and the second metal strip; a welding machine which is disposed adjacent to the press, overlaps the first metal strip and the second metal strip conveyed from the press, and integrally joins the metal strips by welding the same in a state in which the patterns are aligned face-to-face with each other; and a plurality of guide rolls which are arranged in front of and behind the press and guide the first metal strip so that the first metal strip is supplied to the welding machine at an overlapping position with the second metal strip after passing through the press at a position spaced apart from the second metal strip vertically, wherein the pattern may include a first alignment hole, one among a cathode separator plate pattern and an anode separator plate pattern, and a trimming hole, which are formed in the first metal strip, a second alignment hole, the other among the cathode separator plate pattern and the anode separator plate pattern and a trimming hole, which are formed in the second alignment hole.

The press may include a lower bead having a lower mold on an upper surface; an upper bed disposed above the lower bed, and having an upper mold on a lower surface facing the lower bed; a plurality of guide rods disposed between the lower bed and the upper bed to connect the lower bed and the upper bed; and a slide having a lower punch on a lower surface facing the lower mold, an upper punch on an upper surface facing the upper mold, and reciprocating between the lower bed and the upper bed along the plurality of guide rods.

The upper mold may include a first upper mold for forming one among the cathode separator plate pattern and the anode separator plate pattern, and the first alignment hole in the first metal strip, and a second upper mold for forming the trimming hole in the first metal strip conveyed while passing through the first upper mold, and the lower mold may include a first lower mold for forming the other among the cathode separator plate pattern and the anode separator plate pattern, and the second alignment hole in the second metal strip, and a second lower mold forming the trimming hole in the second metal strip conveyed while passing through the first lower mold.

The first upper mold may include a 1-1 upper mold for forming the first alignment hole, and a 1-2 upper mold for forming one among the cathode separator plate pattern and the anode separator plate pattern, and the first lower mold may include a 1-1 lower mold for forming the second alignment hole, and a 1-2 lower mold for forming the other among the cathode separator plate pattern and the anode separator plate pattern.

The first upper mold and the first lower mold may form the plurality of first alignment holes and the plurality of second alignment holes, respectively, to be arranged in a longitudinal direction at edges of the first metal strip and the second metal strip in a width direction, and form the anode separator plate pattern and the cathode separator plate pattern in a center of the first metal strip and the second metal strip in a width direction, and the second upper mold and the second lower mold may form the trimming hole around the anode separator plate pattern and the cathode separator plate pattern, respectively, the trimming hole being provided in a slip shape, partially cut along outer edges of the anode separator plate pattern and the cathode separator plate pattern.

The upper mold and the lower mold may further include an upper-idle mold and a lower-idle mold, not forming the pattern in the first metal strip and the second metal strip, respectively.

Based on a conveyance direction of the first metal strip and the second metal strip, in the upper mold, the upper-idle mold, the first upper mold, and the second upper mold are sequentially disposed, and in the lower mold, the first lower mold, the second lower mold, and the lower-idle mold are sequentially disposed. The second upper mold and the second lower mold may have a dispositional structure in which they do not correspond to each other in a vertical direction, but are displaced from each other so that a distance by which the first metal strip is conveyed from a rear end of the second upper mold to the welding machine is equal to a distance by which the second metal strip is conveyed from a rear end of the second lower mold to the welding machine.

A cutter, disposed adjacent to the welding machine, and cutting a pair of connection portions for maintaining a connection of a portion on which the anode separator plate pattern is formed and a portion on which the cathode separator plate pattern is formed, that is not cut by the trimming hole and is surrounded by the trimming hole with the first metal strip and the second metal strip, respectively, may be further included.

A method of manufacturing a separator plate for a fuel cell includes: a forming operation of vertically arranging a first metal strip and a second metal strip conveyed through a pinch roll side by side, and forming patterns on each of the first metal strip and the second metal strip; and a joining operation of overlapping the first metal strip and the second metal strip conveyed from the forming operation, and integrally joining the metal strips by welding the same in a state in which the patterns are aligned face-to face with each other, wherein the pattern may include a first alignment hole, one among a cathode separator plate pattern and an anode separator plate pattern, and a trimming hole, which are formed in the first metal strip, and a second alignment hole, the other among the cathode separator plate pattern and the anode separator plate pattern, and a trimming hole.

The forming operation may include: a first operation of forming the first alignment hole in the first metal strip, and forming the second alignment hole in the second metal strip; a second operation of forming one among the first cathode separator plate pattern and the anode separator plate pattern in the first metal trip, and forming the other among the cathode separator plate pattern and the anode separator plate pattern in the second metal strip; and a third operation of forming a trimming hole along outer edges of one among the anode separator plate patterns in the first metal strip, and forming a trimming hole along outer edges of the other among the cathode separator plate pattern and the anode separator plate pattern in the second metal strip, conveyed after the second operation. The trimming hole is provided in a slit shape partially cut along the outer edges the anode separator plate pattern and the cathode separator plate pattern, and the portion on which the anode separator plate pattern is formed and the portion on which the cathode separator plate pattern are formed, surrounded by the trimming hole in the first metal strip and the second metal strip may maintain a connection with the first metal strip and the second metal strip through a pair of connection portions that are not cut by the trimming hole.

The second operation may be performed after the first operation, or may be simultaneously with the first operation.

A cutting operation may be further included. In the cutting operation, a joined body of the portion on which the anode separator plate pattern welded by cutting the connection portion from the first metal strip and the second metal strip conveyed after the joining operation, and the portion on which the cathode separator plate pattern is formed is separated from the first metal strip and the second metal strip.

Advantageous Effects

As set forth above, according to an embodiment of the present disclosure, equipment for manufacturing a separator plate for a fuel cell in which a process is continuously performed in an inline manner without performing a process individually and intermittently, and a method of manufacturing the same.

Various and advantageous advantages and effects of the present disclosure are not limited to the above, and will be more easily understood in the course of describing specific embodiments of the present disclosure.

| * DESCRIPTION OF REFERENCE NUMERALS* | | | |
|---|---|---|---|
| 1 | EQUIPMENT OF MANUFACTURING A SEPARATOR FOR A FUEL CELL | | |
| 10 | FIRST UNCOILER | | |
| 20 | SECOND UNCOILER | 30 | PRESS |
| 31 | UPPER MOLD | 32 | LOWER MOLD |
| 33 | UPPER PUNCH | 34 | LOWER PUNCH |
| 35 | GUIDE ROD | 36 | UPPER BED |
| 37 | LOWER BED | 38 | SLIDE |
| 40 | WELDING MACHINE | 50 | CUTTER |
| 80 | GUIDE ROLL | 90 | PINCH ROLL |

-continued

| *DESCRIPTION OF REFERENCE NUMERALS* | | | |
|---|---|---|---|
| M1 | FIRST METAL STRIP | M2 | SECOND METAL STRIP |
| AP | ANODE SEPARATOR PLATE PATTERN | CP | CATHODE SEPARATOR PLATE PATTERN |
| H1 | FIRST ALIGNMENT HOLE | H2 | SECOND ALIGNMENT HOLE |
| HT | TRIMMING HOLE | ND | CONNECTION PORTION |
| SP | SEPARATOR PLATE | | |

MODE FOR INVENTION

Hereinafter, embodiments of the present disclosure will be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

Equipment for manufacturing a separator plate for a fuel cell according to an embodiment of the present disclosure will be described with reference to FIGS. 1 to 7.

Figure 1:
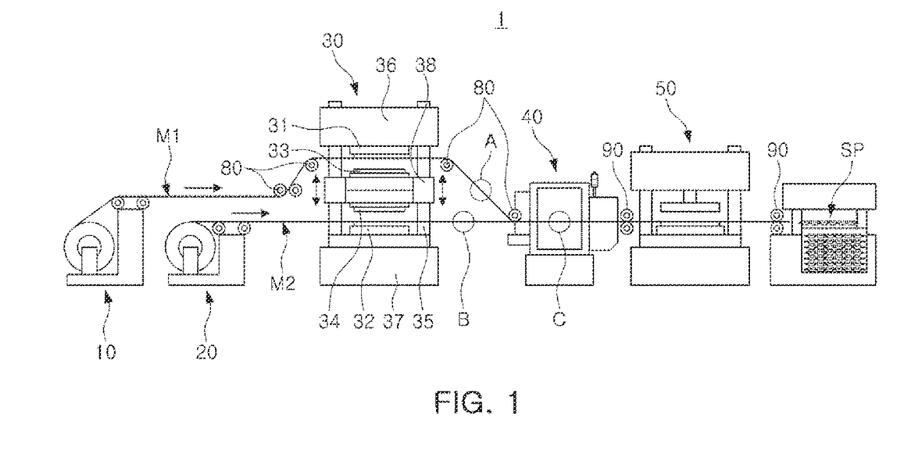
FIG. 1 is a schematic view illustrating equipment for manufacturing a separator for a fuel cell according to an embodiment of the present disclosure.
Figure 2A:
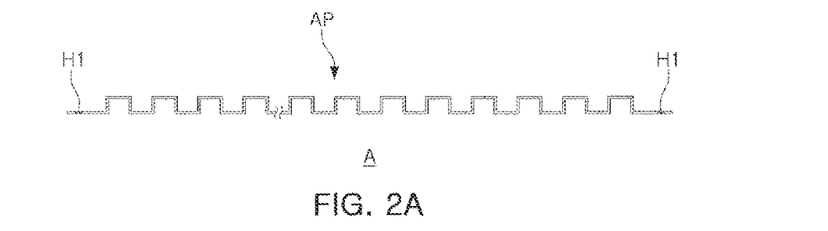
FIG. 2 is a schematic diagram illustrating parts 'A,' 'B,' and 'C' in FIG. 1.
Figure 2B:
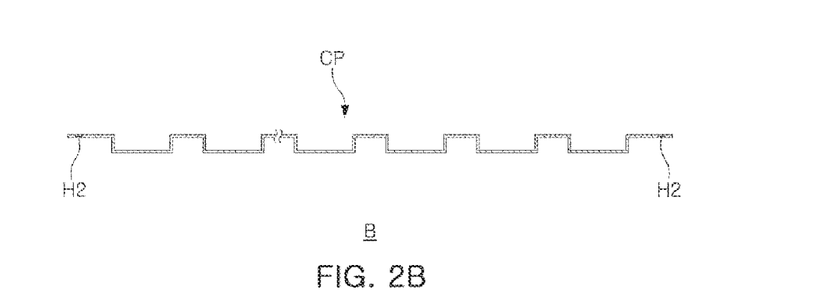
Figure 2C:
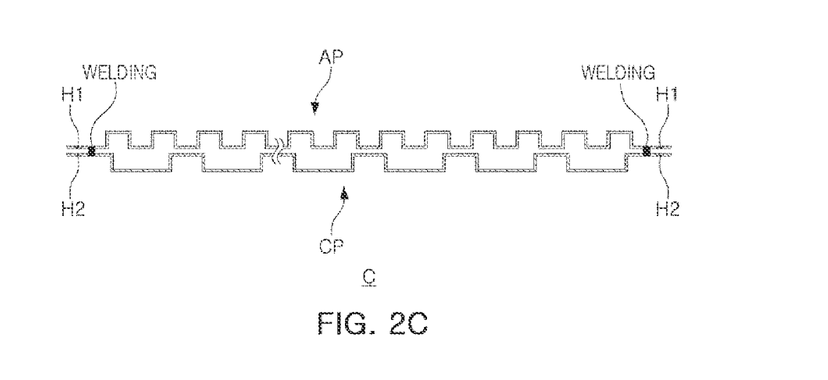
Figure 3:
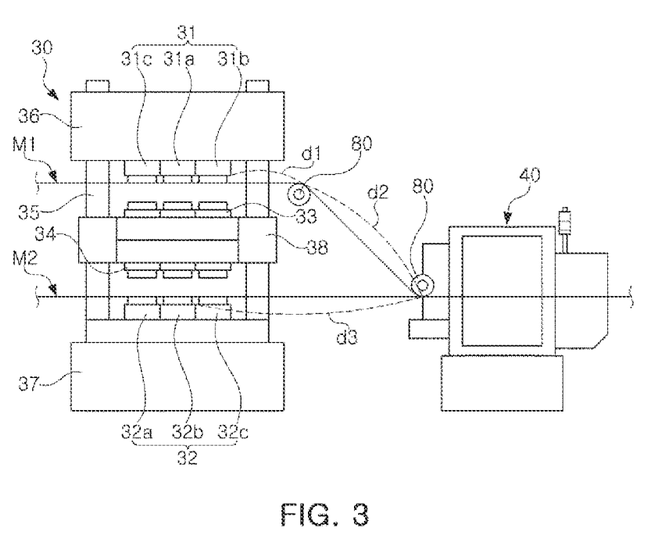
FIG. 3 is a schematic view illustrating a first metal strip and a second metal strip conveyed from a press to a welding machine in the manufacturing facility of the separator for a fuel cell of FIG. 1.

Referring to the drawings, equipment for manufacturing a separator plate for a fuel cell 1 for a separator plate for fuel cell according to an embodiment of the present disclosure may include a press 30, a welding machine 40, and a guide roll 80, and may further include a cutter 50.

In an embodiment, the press 30, the welding machine 40, and the cutter 50 may be sequentially disposed adjacent to each other, and may be processed sequentially while passing through the press 30, the welding machine 40, and the cutter 50 in a state in which the first metal strip M1 and the second metal strip M2 are connected conveyed from the first uncoiler 10 and the second uncoiler 20, respectively. The guide roll 80 may guide conveyance of a first metal strip M1 and a second metal strip M2.

The first metal strip M1 and the second metal strip M2 may be wound in a coil shape and mounted on the first uncoiler 10 and the second uncoiler 20, respectively, and may be conveyed through the pinch roll 90 while being unwound.

The press 30 may form a pattern in each of the first metal strip M1 and the second metal strip M2 through processing. In an embodiment, the anode separator plate pattern AP, the first alignment hole H1, and the trimming hole HT are alternately formed in the first metal strip M1 through reciprocal driving in a vertical direction, and the cathode separator plate pattern CP, the second alignment hole H2, and the trimming hole HT may be formed in the second metal strip M2.

The portion of the first metal strip M1, on which the anode separator plate pattern AP is formed may constitute an anode separator plate of the separator plate SP later, and the portion of the second metal strip M2, on which the cathode separator plate pattern CP is formed may constitute a cathode separator plate of the separator plate SP later. In an embodiment, the anode separator plate pattern AP may include an anode channel and a manifold, and the cathode separator plate pattern CP may include a cathode channel and a manifold.

The press 30 may be vertically disposed side by side in a state in which a first metal strip M1 unwound from the first uncoiler 10 and conveyed and a second metal strip M2 unwound from the second uncoiler 20 and conveyed are spaced apart at regular intervals. In an embodiment, the first metal strip M1 and the second metal strip M2 may be disposed side by side in upper and lower portions of the press 30, respectively. According to an embodiment, on the contrary, the first metal strip M1 and the second metal strip M2 may also be disposed side by side in lower and upper portions of the press 30, respectively.

Figure 4:
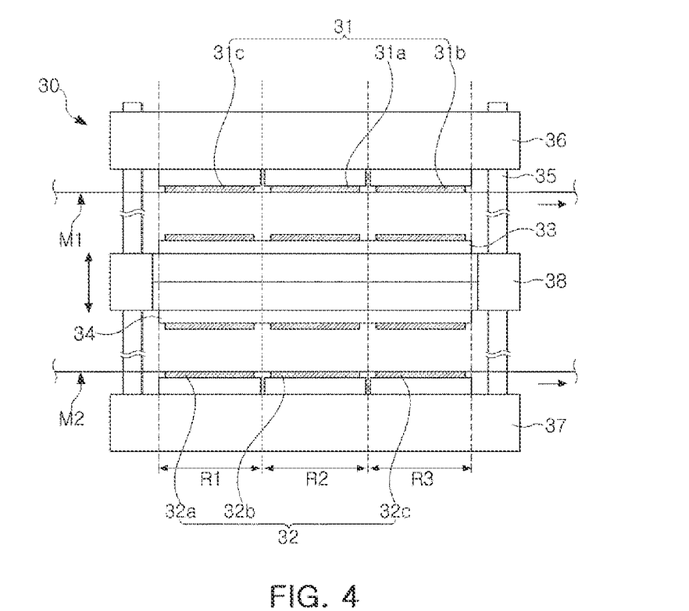
FIG. 4 is a schematic view illustrating a press in the equipment for manufacturing the separator for a fuel cell of FIG. 1.

Referring to the drawings, the press 30 may include a lower bed 37, an upper bed 36, a guide rod 35, and a slide 38. The lower bed 37 may be provided with a lower mold 32 on an upper surface thereof. The upper bed 36 may be disposed above the lower bed 37, and may include an upper mold 31 on a lower surface facing the lower bed 37. The guide rod 35 may be provided in plural, and may be disposed between the lower bed 37 and the upper bed 36 to connect the lower bed 37 and the upper bed 36. The slide 38 may be disposed between the lower bed 37 and the upper bed 36, have a lower punch 34 on a lower surface facing the lower mold 32, and an upper punch 33 on an upper surface facing the upper mold 31, and may be configured to vertically reciprocate between the lower bed 37 and the upper bed 36 along the plurality of guide rods 35. In an embodiment, a servo motor may be used as a power source for driving the slide 38, but an embodiment thereof is not limited thereto. In addition, the slide 38 may be configured as a double-acting type.

In an embodiment, a first metal strip M1 may be supplied between the upper mold 31 and the upper punch 33, and a second metal strip M2 may be supplied between the lower mold 32 and the lower punch 34. As the upper punch 33 and the lower punch 34 reciprocate in a vertical direction between the upper mold 31 and the lower mold 32, the upper punch 33 may alternately press the first metal strip M1 between the upper punch 33 and the upper mold 31 to form an anode separator plate pattern AP and a first alignment hole H1 and a trimming hole HT, and the lower punch 34 may press the second metal strip M2 between the lower punch 34 and the lower mold 32 to form a cathode separator plate pattern CP and a second alignment hole H2 and a trimming hole HT.

In the present embodiment, it is illustrated that the anode separator plate pattern AP is formed in the first metal strip M1 and the cathode separator plate pattern CP is formed in the second metal strip M2, but on the contrary, the cathode separator plate pattern CP may be formed in the first metal strip M1, and the anode separator plate pattern AP may be formed in the second metal strip M2.

In an embodiment, based on a conveyance direction of the first metal strip M1 and the second metal strip M2, the lower bed 37 and the upper bed 36 may be divided into at least three regions including a first region R1, a second region R2, and a third region R3, respectively. According to an embodiment, the lower bed 37 and the upper bed 36 may also be divided into three or more regions.

The lower mold 32 may include a first lower mold 32a and a second lower mold 32b, and may further include a lower-idle mold 32c. The upper mold 31 may include a first upper mold 31a and a second upper mold 31b, and may further include an upper-idle mold 31c.

Based on a conveyance direction of the first metal strip M1 and the second metal strip M2, in the lower mold 32, a first lower mold 32a, a second lower mold 32b, and a lower-idle mold 32c may be sequentially disposed, and in the upper mold 31, an upper-idle mold 31c, a first upper mold 31a, and a second upper mold 31b may be sequentially disposed.

The first lower mold 32a may be disposed in the first region R1 to form a second alignment hole H2 and a cathode separator plate pattern CP in the second metal strip M2, the second lower mold 32b may be disposed in the second region R2 to from a trimming hole HT in the second metal strip M2 conveyed while passing through the first lower mold 32a, and the lower-idle mold 32c may be disposed in the third region R3 and pass through the second metal strip M2 conveyed while passing through the second lower mold 32b without forming a pattern.

The upper-idle mold 31c may be disposed in the first region R1 to not form a pattern in the first metal strip M1, the upper mold 31a may be disposed in the second region R2 to form a first alignment hole H1 and an anode separator plate pattern AP in the first metal strip M1 conveyed while passing through the upper-idle mold 31c, and the second upper mold 31b may be disposed in the third region R3 to form a trimming hole HT in the first metal strip M1 conveyed while passing through the first upper mold 31a.

Accordingly, the first lower mold 32a and the first upper mold 31a and the second lower mold 32b and the second upper mold 31b may have a dispositional structure that they do not correspond to each other in a vertical direction and is displaced from each other so that a distance d3 by which the second metal strip M2 is conveyed from a rear end of the second lower end 32b to the welding machine 40 is equal to a distance (d1+d2) by which the metal strip M1 is conveyed from the rear end of the second upper mold 31b to the welding machine 40.

As described above, in forming a pattern alternately in the first metal strip M1 and the second metal strip M2 through reciprocal driving in a vertical direction, the press 30 may have a structure of a mold that is displaced from each other by one region R, such that the positions at which a pattern is formed between the first metal strip M1 and the second metal strip M2 may be different from each other. In the present embodiment, it is illustrated as having a dispositional structure displaced by one region R, but it is limited thereto, and it is also possible to adjust to be displaced by two or more regions or half regions according to a difference in distance.

As described above, the first upper mold 31a, the first lower mold 32a, and the second upper mold 31b and the second lower mold 32b have an dispositional structure that is vertically displaced from each other, so that a position at which the first metal strip M1 and the second metal strip M2 may be different from each other. Unlike the second metal strip M2 that is conveyed relatively horizontally, as the first metal strip M1 disposed above the second metal strip M2 is conveyed obliquely downward by the guide roll 80 so that it overlaps on the second metal strip M2 for welding, since the moving distance is longer than that of the second metal strip M2, this is to compensate for the distance difference.

This distance difference compensation may be implemented through the upper-idle mold 31c and the lower-idle mold 32c.

Meanwhile, the lower mold 32 and the upper mold 31 may be provided on the upper surface of the lower bed 37 and the lower surface of the upper bed 36, respectively, so that a position thereof may be adjusted according to the conveyance direction of the first metal strip M1 and the second metal strip M2. Accordingly, it is possible to more accurately adjust the compensation for a difference in distance. The distance may be adjusted by changing sizes of the upper-idle mold 31c and the lower-idle mold 32c.

Figure 6:
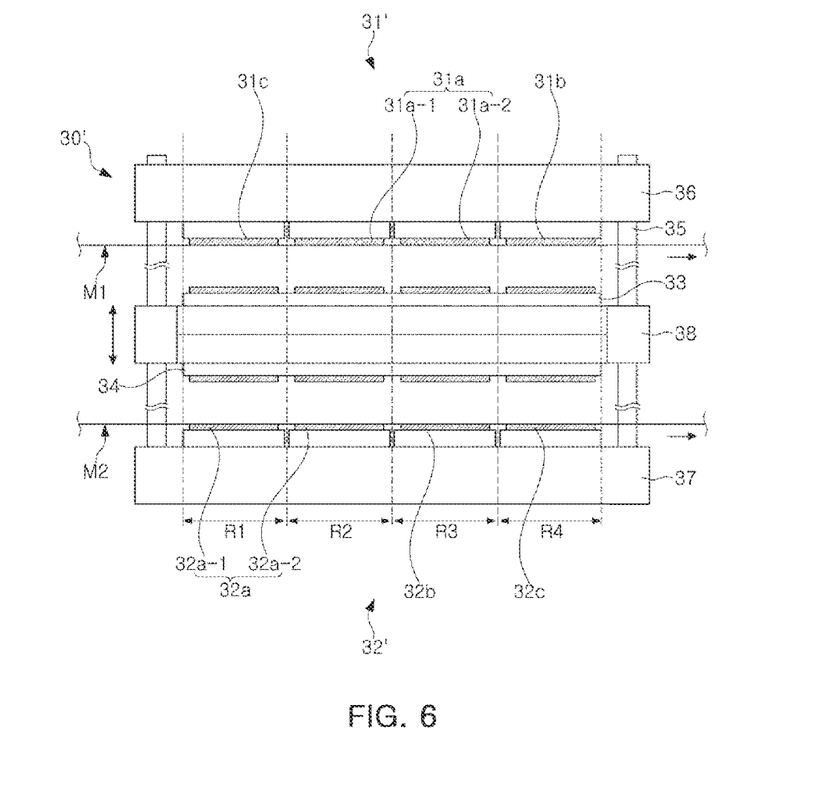
FIG. 6 is a schematic view illustrating a modified example of the press.

FIG. 6 schematically shows a modified example of a press 30'.

Referring to FIG. 6, the lower bed 37 and the upper bed 36 may be divided into at least four regions including a first region R1, a second region R2, a third region R3, and a third region R4, respectively.

In the upper mold 31,' an upper-idle mold 31c, a first upper mold 31a including a 1-1 upper mold 31a-1 and a 1-2 upper mold 31a-2 and a second upper mold 31b may be sequentially disposed.

In the lower mold 32,' a first lower mold 32a including a 1-1 lower mold 32a-1 and a 1-2 lower mold 32a-2, a second lower mold 32b, and a lower-idle mold 32c may be sequentially disposed.

The 1-1 lower mold 32a-1 may form a second alignment hole H2 in the second metal strip M2 in the first region R1, the 1-2 lower mold 32a-2 may form a cathode separator plate pattern CP in the second metal strip M2 conveyed while passing through the 1-1 lower mold 32a-1 in the second region R2, the second lower mold 32b may form a trimming hole HT in the second metal strip M2 conveyed while passing through the 1-2 lower mold 32a-2 in the third region R3, and the lower-idle mold 32c may pass through the second metal strip M2 conveyed while passing through the second lower mold 32b in the fourth region R4 without forming a pattern.

The upper-idle mold 31c may be disposed in the first region R1 to not form a pattern in the first metal strip M1, the 1-1 upper mold 31a-1 may be disposed in the second region R2 and form a first alignment hole H1 in the first metal strip M1 conveyed while passing through the upper-idle mold 31c, the 1-2 upper mold 31a-2 may be disposed in the third region R3 and form an anode separator plate pattern AP in the first metal strip M1 conveyed while passing through the 1-1 upper mold 31a-1, and the second upper mold 31b may be disposed in the fourth region R4 and form a trimming hole HT in the first metal strip M1 conveyed while passing through the 1-2 upper mold 31a-2.

The welding machine 40 may be disposed adjacent to the press 30, and may integrally bond the first metal strip M1 and the second metal strip M2 respectively passing through the press 30. For example, the welding machine 40 may include a laser welding machine, and may weld the first metal strip M1 and the second metal strip M2 through high-speed scan welding.

The welding machine 40 may overlap the first metal strip M1 and the second metal strip M2 conveyed from the press 30, and integrally join the metal strips by welding the same in a state in which an anode separator plate pattern AP and a cathode separator plate pattern CP are aligned face-to-face with each other. In the anode separator plate pattern AP and the cathode separator plate pattern CP may be disposed to be vertically aligned.

In welding and joining the first metal strip M1 and the second metal strip M2, it is important that the anode separator plate pattern AP and the cathode separator plate pattern CP are accurately aligned at positions corresponding to each other. Since this alignment is directly related to the quality of the separator plate SP, it needs to be done in an automatic manner through the device.

In the present embodiment, the first metal strip M1 and the second metal strip M2 that are separated and conveyed separately overlap the first alignment hole H1 and the second alignment hole H2 in a state in which they correspond to each other, such that an anode separator plate pattern AP and a cathode separator plate pattern CP may be aligned. In this case, whether the first alignment hole H1 and the second alignment hole H2 correspond to each other, for example, by reading an image taken using a camera (not shown) may be configured to automatically check whether the holes correspond to each other.

According to an embodiment, a metal sheet (not shown) in a form of a mesh may be further attached to a surface of at least one of the first metal strip M1 and the second metal strip M2. The mesh-shaped metal sheet may be attached through welding, and may constitute a flow path together with the anode separator plate pattern AP or the cathode separator plate pattern CP.

As described above, in a process of being conveyed while passing through the press 30 and the welding machine 40 through a pinch roll 90 in a state in which the first metal strip M1 and the second metal strip M2 are connected, the press may alternately form a pattern in the first metal strip M1 and a pattern in the second metal strip M2 through reciprocal driving in a vertical direction. In addition, the welding machine 40 may weld the first metal strip M1 and the second metal strip M2 in which the patterns are respectively formed and conveyed, and integrally join the same.

The cutter 50 may be disposed adjacent to the welding machine 40, and may cut a joined body of the first metal strip M1 and the second metal strip M2 joined by welding, conveyed while passing through the welding machine 40. For example, the cutter 50 may include a cutting press.

The cutter 50 may cut the joined body of the first metal strip M1 and the second metal strip M2 joined through welding to separate the same from the first metal strip M1 and the second metal strip M2. Thereby, a separator plate (SP) for a fuel cell in which the anode separator plate and the cathode separator plate are joined by welding may be manufactured.

The separator SP for a fuel cell manufactured as described above may be packaged and shipped through a loading device only after a finishing process such as scrap process, or the like, is performed, and then external inspection and air tightness inspection are performed to be confirmed as a final product.

Figure 7:
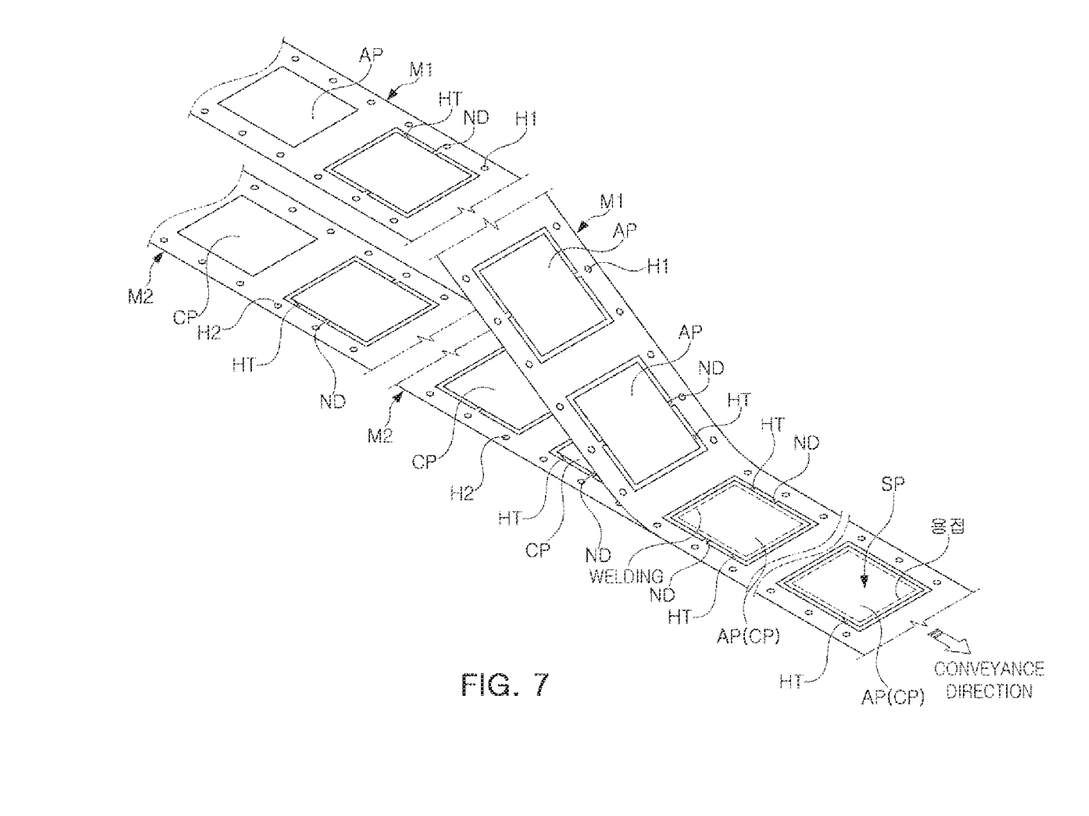
FIG. 7 is a schematic view illustrating a state in which the first and second metal strips are conveyed along a conveyance direction and processed sequentially.

FIG. 7 schematically shows a state in which a first metal strip and a second metal strip are sequentially processed while being conveyed through a press, a welding machine, and a cutter.

Figure 5A:
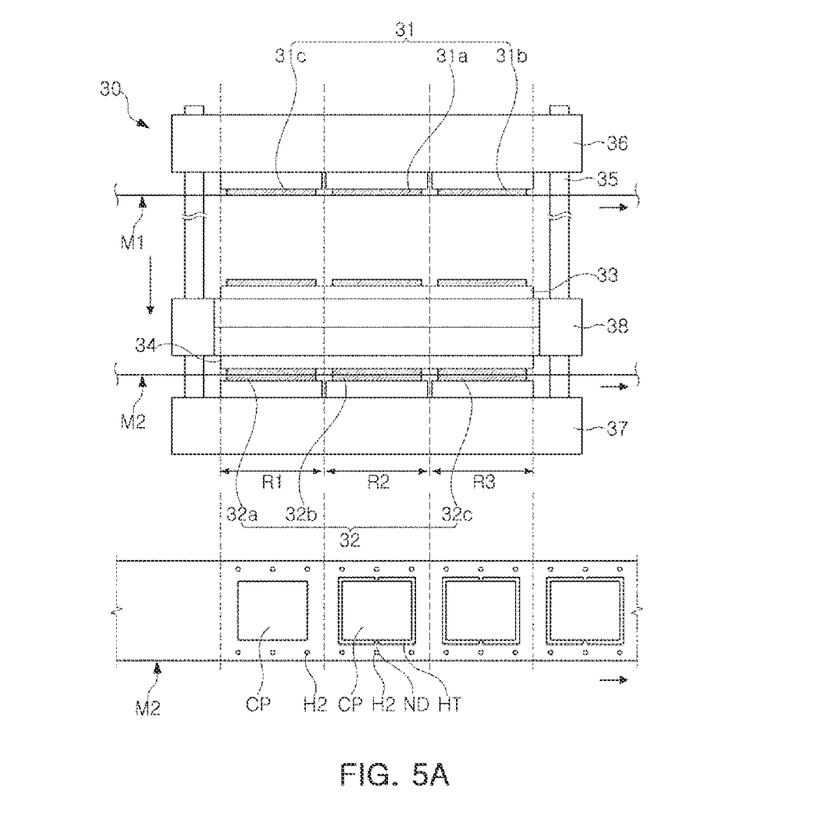
FIGS. 5A and 5B are schematic diagrams illustrating an operation of the press of FIG. 4.
Figure 5B:
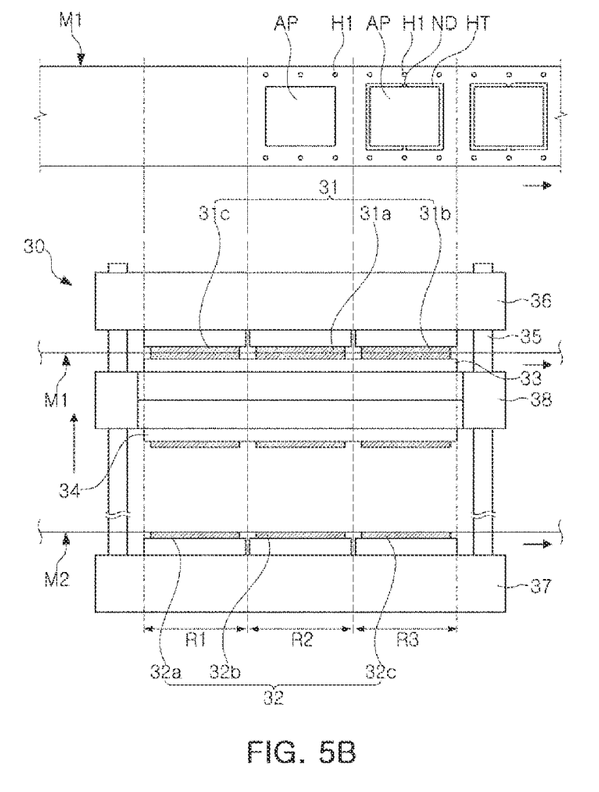

Referring to FIG. 7 together with FIGS. 5A and 5B, in a process in which the first metal strip M1 conveyed through the pinch roll 90 passes through the press 30, nothing may be formed in a first region R1 in which the upper-idle mold 31c is disposed, and when the first metal strip M1 is conveyed to a second region R2, a first alignment hole H1 and an anode separator plate pattern AP may be primarily formed by the first upper mold 31a. In addition, when the first metal strip M1 is conveyed to a third region R3, a trimming hole HT may be formed by the second upper mold 31b.

Similarly, in a process in which the second metal strip M2 conveyed through the pinch roll 90 passes through the press 30, a second alignment hole H2 and a cathode separator plate pattern CP may be primarily formed by the first lower mold 32a in the first region R1. Thereafter, when the second metal strip M2 is conveyed to the second region R2, a trimming hole HT may be formed by the second lower mold 32b. In addition, nothing may be formed and conveyed in the third region R3 in which the lower-idle mold 32c is disposed.

That is, when the first metal strip M1 and the second metal strip M2 are simultaneously conveyed while passing through the press 30, a second alignment hole H2 and a cathode separator plate pattern CP may be formed in the second metal strip M2 and nothing may be formed in the first metal strip M1 in the first region R1. Next, when conveyed to the second region R2, a first alignment hole H1 and an anode separator plate pattern AP may be formed in the first metal strip M1, and a trimming hole HT may be formed in the second metal strip M2. Next, when conveyed to the third region R3, a trimming hole HT may be formed in the first metal strip M1, and nothing may be formed in the second metal strip M2.

The plurality of first alignment holes H1 and the second alignment holes H2 may be arranged in a longitudinal direction at edges of the first metal strip M1 and the second metal strip M2 in a width direction. In addition, the anode separator plate pattern AP and the cathode separator plate pattern CP may be positioned in a center of the first metal strip M1 and the second metal strip M2 in a width direction, respectively. In addition, the trimming hole HT may be provided in a slit shape partially cut along the outer edges of the anode separator plate pattern AP and the cathode separator plate pattern CP.

The portion on which the anode separator plate pattern AP is formed and the portion on which the cathode separator plate pattern CP is formed, which is surrounded by the trimming hole HT, in the first metal strip M1 and the second metal strip M2, may maintain a connection with the first metal strip M1 and the second metal strip M2, respectively through a pair of connection portions ND, which is not cut by the trimming hole HT. In this case, the pair of connection portions NF may be respectively connected to the first metal strip M1 and the second metal strip M2, with a structure crossing the trimming hole HT on both sides of the portion on which the anode separator plate pattern AP is formed and the portion on which the cathode separator plate pattern CP is formed in a width direction. That is, the portion on which the anode separator plate pattern AP and the portion on which the cathode separator plate pattern CP is formed may maintain a state of being connected to the first metal strip M1 and the second metal strip M2 through the pair of connection portions ND extending in a width direction of the first metal strip M1 and the second metal strip M2, respectively.

Therefore, even if the first metal strip M1 and the second metal strip M2 are not horizontally conveyed in a flat state and are bent by the guide roll 80, the portion on which the anode separator plate pattern AP is formed and the portion on which the cathode separator plate pattern CP is formed may maintain a flat state.

In addition, in alternately forming a pattern in the first metal strip M1 and the second metal strip M2, respectively, through the press 30 reciprocating in a vertical direction, by having a dispositional structure of a mold that is displaced from each other by one region, a position at which a pattern is formed between the first metal strip M1 and the second metal strip M2 may be different from each other. Since the moving distance when the first metal strip M1 disposed on the second metal strip M1 is overlapped above the second metal strip M2 for welding is longer than that of the second metal strip M2, this is to compensate for the distance difference. Accordingly, the first metal strip M1 and the second metal strip M2 may overlap in a state in which the anode separator plate pattern AP and the cathode separator plate pattern CP are aligned to face each other.

Thereafter, the first metal strip M1 and the second metal strip M2 may be conveyed to the welding machine 40 and joined to each other through welding. The portion on which the anode separator plate pattern AP is formed and the portion on which the cathode separator plate pattern CP is formed through welding may overlap each other and be joined.

Thereafter, the first metal strip M1 and the second metal strip M2 may be conveyed to the cutter 50 and the connection portion ND may be cut, such that a joined body of the portion on which the anode separator plate pattern AP is formed, which are joined to each other may be separated from the first metal strip M1 and the second metal strip M2.

The joined body of the portion on which the anode separator plate pattern AP is formed and the portion on which the cathode separator plate pattern CP is formed may be finished to complete the separator plate SP for a fuel cell.

Figure 8:
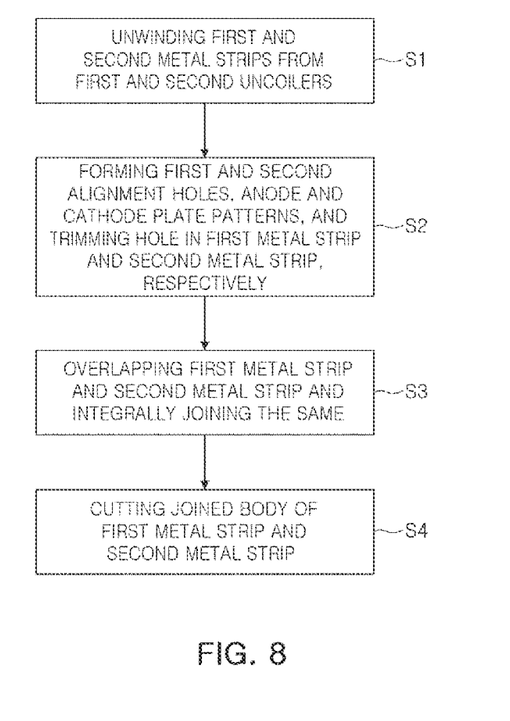
FIG. 8 is a flowchart illustrating a method of manufacturing a separator plate for a fuel cell according to an embodiment of the present disclosure.

A method of manufacturing a separator plate for a fuel cell according to an embodiment of the present disclosure will be described with reference to FIG. 8. FIG. 8 is a flowchart illustrating a method of manufacturing a separator plate for a fuel cell according to another embodiment of the present disclosure.

First, a first metal strip M1 may be unwound from a first uncoiler 10, and a second metal strip M2 may be unwound from a second uncoiler 20, and conveyed, through a pinch roll such that a manufacturing process may be started (S1).

Next, the first metal strip M1 and the second metal strip M2, conveyed through a pinch roll 90 is disposed side by side on the press 30 in a vertical direction, and a pattern is formed in the first metal strip M1 and the second metal strip M2, respectively (forming operation, S2). In this case, the pattern may be alternately formed in the first metal strip M1 through a press 30 reciprocating in a vertical direction, and the pattern may be formed in the second metal strip M2.

Specifically, a first alignment hole H1 is formed in the first metal strip M1 through the press 30, and a second alignment hole H2 is formed in the second metal strip M2 (first operation).

Next, when the first metal strip M1 and the second metal strip M2 are conveyed, an anode separator plate pattern AP may be formed in the conveyed first metal strip M1, and a cathode separator plate pattern CP may be formed in the conveyed second metal strip M2 (second operation). On the contrary, the cathode separator plate pattern CP may also be formed in the first metal strip M1, and the anode separator plate pattern AP may be formed in the second metal strip M2. According to an embodiment, the second operation may be performed after the first operation, or may be performed simultaneously with the first operation.

Next, when the first metal strip M1 and the second metal strip M2 are conveyed, a trimming hole HT is formed along an outer edge of the anode separator plate pattern AP in the conveyed first metal strip M1, and a trimming hole HT is formed along an outer edge of the cathode separator plate pattern CP in the conveyed second metal strip M2 (third operation).

The trimming hole HT may be provided in a slit shape, partially cut along the outer edges of the anode separator plate pattern AP and the cathode separator plate pattern CP. In the first metal strip M1 and the second metal strip M2, a portion on which the anode separator plate pattern AP and a portion on which the cathode separator plate pattern CP is formed, surrounded by the trimming hole HT may maintain a connection with the first metal strip M1 and the second metal strip M2, respectively, through a pair of connection portions ND, which are not cut by the trimming hole HT, respectively.

Next, the first metal strip M1 and the second metal strip M2 conveyed after the forming operation is overlapped each other and are integrally joined by welding the same in a state in which the anode separator plate pattern AP and the cathode separator plate pattern CP are aligned with face-to-face with each other in a bonding operation, S3).

In this case, the first metal strip M1 and the second metal strip M2 overlap in a state in which the first alignment hole H1 and the second alignment hole H2 correspond to each other, so that the anode separator plate pattern AP and the cathode separator plate pattern CP may be aligned.

Next, a joined body of the portion on which the anode separator plate pattern AP is formed and the portion on which the cathode separator plate pattern CP, which are obtained by cutting the connection portion ND from the first metal strip M1 and the second metal strip M2 and welded, conveyed from the joining operation, is separated from the first metal strip M1 and the second metal strip M2 (cutting operation, S4).

Thereby, a separator plate SP for a full cell in which the anode separator plate and the cathode separator plate are joined by welding may be manufactured.

The separator plate (SP) for a fuel cell manufactured described above may then be packaged through a loading device and shipped as a final product when it passes an appearance inspection and air tightness inspection after a finishing process such as scrap processing is performed.

The present disclosure is not limited to the exemplary embodiments and the examples, but may be made in various forms different from each other, and those skilled in the art will understand that the present disclosure may be implemented in other specific forms without departing from the spirit or essential feature of the present disclosure. Therefore, it should be understood that the above-mentioned exemplary embodiments and examples are illustrative but not restrictive in all aspects.

The invention claimed is:

1. Equipment for manufacturing a separator plate for a fuel cell, comprising:
   a press receiving a conveyed first metal strip and a second metal strip that are unwound from a first uncoiler and a second uncoiler, respectively, vertically arranging the metal stripes side by side, and forming patterns on each of the first metal strip and the second metal strip;
   a welding machine which is disposed adjacent to the press, overlaps the first metal strip and the second metal strip conveyed from the press, and integrally joins the metal strips by welding the same in a state in which the patterns are aligned face-to-face with each other; and
   a plurality of guide rolls which are arranged in front of and behind the press and guide the first metal strip so that the first metal strip is supplied to the welding machine at an overlapping position with the second metal strip after passing through the press at a position spaced apart from the second metal strip vertically, wherein the patterns include, a first alignment hole, one among a cathode separator plate pattern and an anode separator plate pattern, and a trimming hole, which are formed in the first metal strip, a second alignment hole, the other among the cathode separator plate pattern and the anode separator plate pattern, and a trimming hole, which are formed in the second metal strip, and wherein the press comprises, a lower bed having a lower mold on an upper surface;

an upper bed disposed above the lower bed, and having an upper mold on a lower surface facing the lower bed;

a plurality of guide rods disposed between the lower bed and the upper bed to connect the lower bed and the upper bed; and a slide having a lower punch on a lower surface facing the lower mold, and an upper punch on an upper surface facing the upper mold, the slide reciprocating between the lower bed and the upper bed along the plurality of guide rods.

2. The equipment for manufacturing a separator plate for a fuel cell of claim 1, wherein the upper mold comprises a first upper mold for forming one among the cathode separator plate pattern and the anode separator plate pattern, and the first alignment hole in the first metal strip, and a second upper mold for forming the trimming hole in the first metal strip conveyed while passing through the first upper mold, wherein the lower mold comprises a first lower mold for forming the other among the cathode separator plate pattern and the anode separator plate pattern, and the second alignment hole in the second metal strip, and a second lower mold for forming the trimming hole in the second metal strip conveyed while passing through the first lower mold.

3. The equipment for manufacturing a separator plate for a fuel cell of claim 2, wherein the first upper mold comprises a 1-1 upper mold for forming the first alignment hole, and a 1-2 upper mold for forming one among the cathode separator plate pattern and the anode separator plate pattern, wherein the first lower mold comprises a 1-1 lower mold for forming the second alignment hole, and a 1-2 lower mold for forming the other among the cathode separator plate pattern and the anode separator plate pattern.

4. The equipment for manufacturing a separator plate for a fuel cell of claim 2, wherein the first upper mold and the first lower mold form the plurality of first alignment holes and the plurality of the second alignment holes, respectively, to be arranged in a longitudinal direction at edges of the first metal strip and the second metal strip in a width direction, and form the anode separator plate pattern and the cathode separator plate pattern in a center of the first metal strip and the second metal strip in a width direction, wherein the second upper mold and the second lower mold form the trimming hole around the anode separator plate pattern and the cathode separator plate pattern, respectively, the trimming hole being provided in a slit shape, partially cut along outer edges of the anode separator plate pattern and the cathode separator plate pattern.

5. The equipment for manufacturing a separator plate for a fuel cell of claim 2, wherein the upper mold and the lower mold further comprise an upper-idle mold and a lower-idle mold, that do not form the pattern in the first metal strip and the second metal strip, respectively.

6. The equipment for manufacturing a separator plate for a fuel cell of claim 5, wherein, based on a conveyance direction of the first metal strip and the second metal strip, in the upper mold, the upper-idle mold, the first upper mold, and the second upper mold are sequentially disposed, and in the lower mold, the first lower mold, the second lower mold, and the lower-idle mold are sequentially disposed, wherein the second upper mold and the second lower mold have a dispositional structure that they do not correspond to each other in a vertical direction and are displaced from each other, such that a distance at which the first metal strip is conveyed from a rear end of the second upper mold to the welding machine is equal to a distance at which the second metal strip is conveyed from a rear end of the second lower mold to the welding machine.

7. The equipment for manufacturing a separator plate for a fuel cell of claim 4, further comprising a cutter disposed adjacent to the welding machine, and cutting a pair of connection portions not being cut by the trimming hole and maintaining a connection of a portion on which the anode separator plate pattern is formed and a portion on which the cathode separator plate pattern is formed, which are surrounded by the trimming hole, with the first metal strip and the second metal strip, respectively.

* * * * *